US012671984B1

(12) United States Patent
Zhang et al.

(10) Patent No.: US 12,671,984 B1
(45) Date of Patent: Jun. 30, 2026

(54) APPENDING NETWORK NAMES TO DISTINGUISH SERVICE PROVIDER NETWORKS

(71) Applicant: Calix, Inc., San Jose, CA (US)

(72) Inventors: Xiaolei Zhang, Jiangsu (CN); Hylan Chen, Nanjing City (CN); Daniel J. Sills, Moss Beach, CA (US); Martin Casey, Dallas, TX (US)

(73) Assignee: Calix, Inc., San Jose, CA (US)

( * ) Notice: Subject to any disclaimer, the term of this patent is extended or adjusted under 35 U.S.C. 154(b) by 369 days.

(21) Appl. No.: 18/448,443

(22) Filed: Aug. 11, 2023

(51) Int. Cl.
H04W 8/26 (2009.01)
H04W 48/16 (2009.01)
H04W 48/18 (2009.01)
H04W 84/12 (2009.01)

(52) U.S. Cl.
CPC ............. *H04W 8/26* (2013.01); *H04W 48/16* (2013.01); *H04W 48/18* (2013.01); *H04W 84/12* (2013.01)

(58) Field of Classification Search
CPC ....... H04W 8/26; H04W 48/16; H04W 48/18; H04W 84/12
USPC .......................................................... 370/338
See application file for complete search history.

(56) References Cited

U.S. PATENT DOCUMENTS

| | | | |
|---|---|---|---|
| 2004/0064591 A1* | 4/2004 | Noble | H04W 48/18 |
| | | | 709/250 |
| 2007/0019609 A1* | 1/2007 | Anjum | H04L 63/0414 |
| | | | 370/349 |
| 2015/0188940 A1* | 7/2015 | Lapidous | H04L 63/0272 |
| | | | 726/25 |
| 2019/0230103 A1* | 7/2019 | Hart | H04L 43/10 |
| 2022/0060975 A1* | 2/2022 | Li | H04W 8/26 |
| 2024/0334288 A1* | 10/2024 | Smith | H04W 48/12 |

* cited by examiner

*Primary Examiner* — Asad M Nawaz
*Assistant Examiner* — Michael Wayne Maddox
(74) *Attorney, Agent, or Firm* — Shumaker & Sieffert, P.A.

(57) ABSTRACT

A network system includes a memory, and processing circuitry in communication with the memory. The processing circuitry is configured to identify, for each service provider network of a set of service provider networks, a network name associated with the service provider network, wherein two or more service provider networks of the set of service provider networks are associated with the same network name. Additionally, the processing circuitry is configured to append the network name corresponding to each service provider network of the set of service provider networks with a respective network identifier to generate a set of appended network names. Each appended network name of the set of appended network names may be different than each other appended network name of the set of appended network names. The processing circuitry is configured to output a network device corresponding to each service provider network of the set of service provider networks.

18 Claims, 6 Drawing Sheets

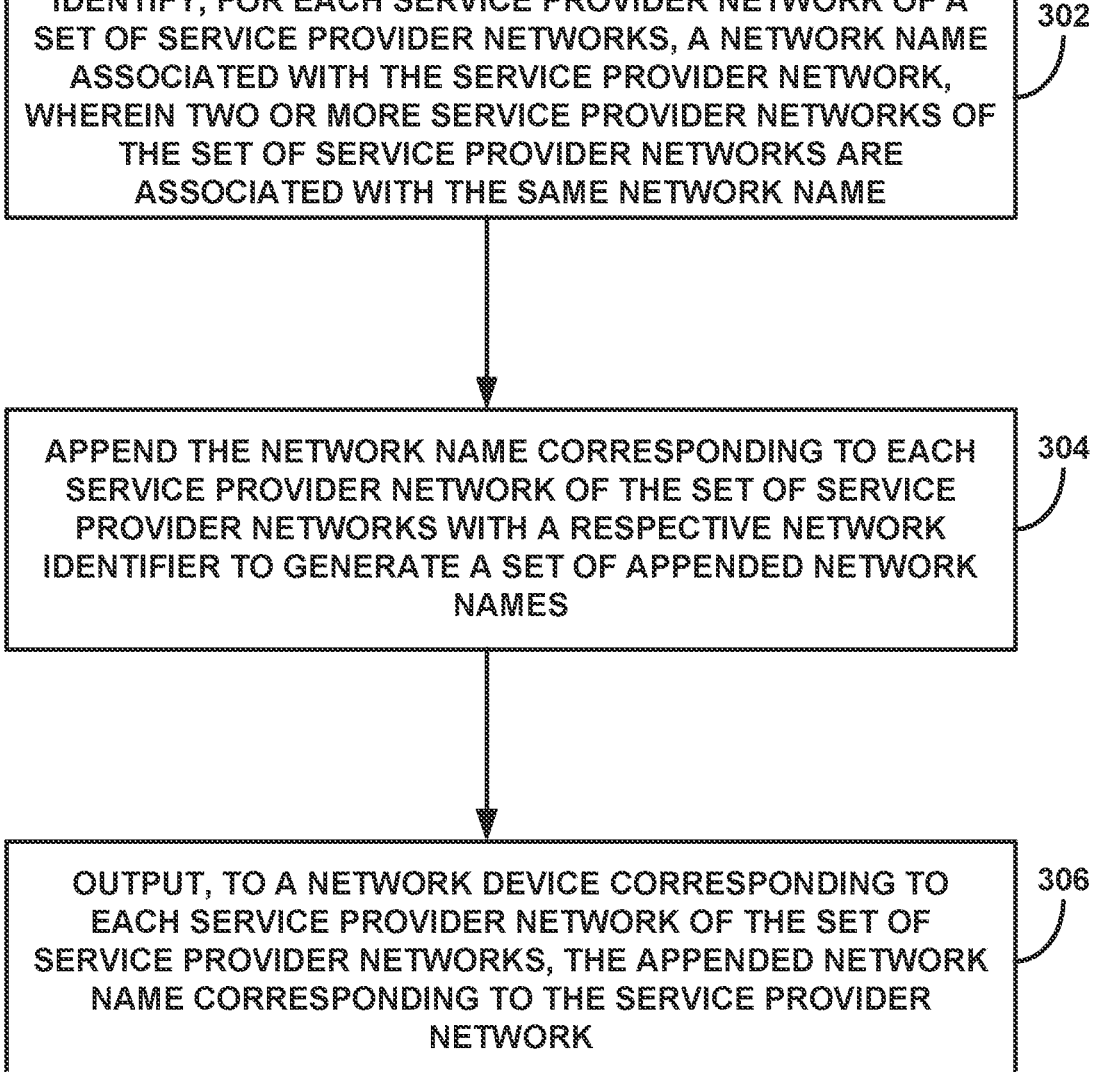

IDENTIFY, FOR EACH SERVICE PROVIDER NETWORK OF A SET OF SERVICE PROVIDER NETWORKS, A NETWORK NAME ASSOCIATED WITH THE SERVICE PROVIDER NETWORK, WHEREIN TWO OR MORE SERVICE PROVIDER NETWORKS OF THE SET OF SERVICE PROVIDER NETWORKS ARE ASSOCIATED WITH THE SAME NETWORK NAME — 302

APPEND THE NETWORK NAME CORRESPONDING TO EACH SERVICE PROVIDER NETWORK OF THE SET OF SERVICE PROVIDER NETWORKS WITH A RESPECTIVE NETWORK IDENTIFIER TO GENERATE A SET OF APPENDED NETWORK NAMES — 304

OUTPUT, TO A NETWORK DEVICE CORRESPONDING TO EACH SERVICE PROVIDER NETWORK OF THE SET OF SERVICE PROVIDER NETWORKS, THE APPENDED NETWORK NAME CORRESPONDING TO THE SERVICE PROVIDER NETWORK — 306

FIG. 3

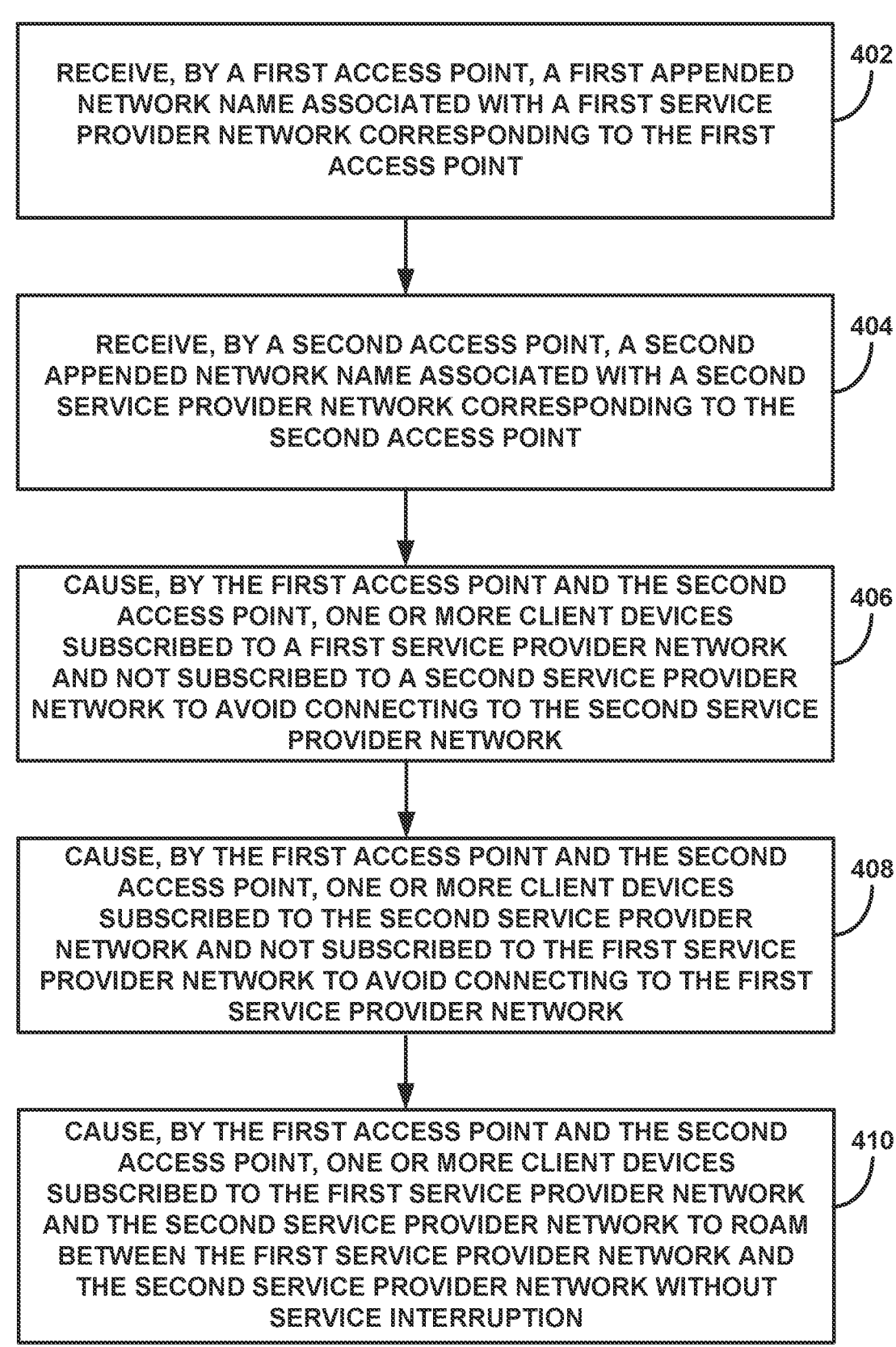

RECEIVE, BY A FIRST ACCESS POINT, A FIRST APPENDED NETWORK NAME ASSOCIATED WITH A FIRST SERVICE PROVIDER NETWORK CORRESPONDING TO THE FIRST ACCESS POINT    402

RECEIVE, BY A SECOND ACCESS POINT, A SECOND APPENDED NETWORK NAME ASSOCIATED WITH A SECOND SERVICE PROVIDER NETWORK CORRESPONDING TO THE SECOND ACCESS POINT    404

CAUSE, BY THE FIRST ACCESS POINT AND THE SECOND ACCESS POINT, ONE OR MORE CLIENT DEVICES SUBSCRIBED TO A FIRST SERVICE PROVIDER NETWORK AND NOT SUBSCRIBED TO A SECOND SERVICE PROVIDER NETWORK TO AVOID CONNECTING TO THE SECOND SERVICE PROVIDER NETWORK    406

CAUSE, BY THE FIRST ACCESS POINT AND THE SECOND ACCESS POINT, ONE OR MORE CLIENT DEVICES SUBSCRIBED TO THE SECOND SERVICE PROVIDER NETWORK AND NOT SUBSCRIBED TO THE FIRST SERVICE PROVIDER NETWORK TO AVOID CONNECTING TO THE FIRST SERVICE PROVIDER NETWORK    408

CAUSE, BY THE FIRST ACCESS POINT AND THE SECOND ACCESS POINT, ONE OR MORE CLIENT DEVICES SUBSCRIBED TO THE FIRST SERVICE PROVIDER NETWORK AND THE SECOND SERVICE PROVIDER NETWORK TO ROAM BETWEEN THE FIRST SERVICE PROVIDER NETWORK AND THE SECOND SERVICE PROVIDER NETWORK WITHOUT SERVICE INTERRUPTION    410

FIG. 4

APPENDING NETWORK NAMES TO DISTINGUISH SERVICE PROVIDER NETWORKS

TECHNICAL FIELD

This disclosure relates to networking, and more particularly, communication between client devices and access points in a wireless network.

BACKGROUND

A wireless network, such as a wireless network configured for operation in accordance with the Wi-Fi protocols, includes access points and client devices. Client devices may connect to access points in order to access a Wide Area Network (WAN), such as the internet. In some examples, access points may be located with one or more Local Area Networks (LANs) that connect with the WAN. Service provider devices may provide services to the client devices via the WAN, one or more LANs, and the access points. In some examples, access points may be associated with one or more addresses (e.g., media access control (MAC) addresses), service provider information, and network information. One example of a Wi-Fi protocol is Passpoint®, which streamlines Wi-Fi access by facilitating an ability of user devices to find available networks.

BRIEF DESCRIPTION OF DRAWINGS

FIG. 3 is a flow diagram illustrating an example operation for appending network names to distinguish service provider networks, in accordance with one or more techniques of this disclosure.

FIG. 4 is a flow diagram illustrating an example operation for using appended network names to prevent service interruptions, in accordance with one or more techniques of this disclosure.

DETAILED DESCRIPTION

Figure 1A:
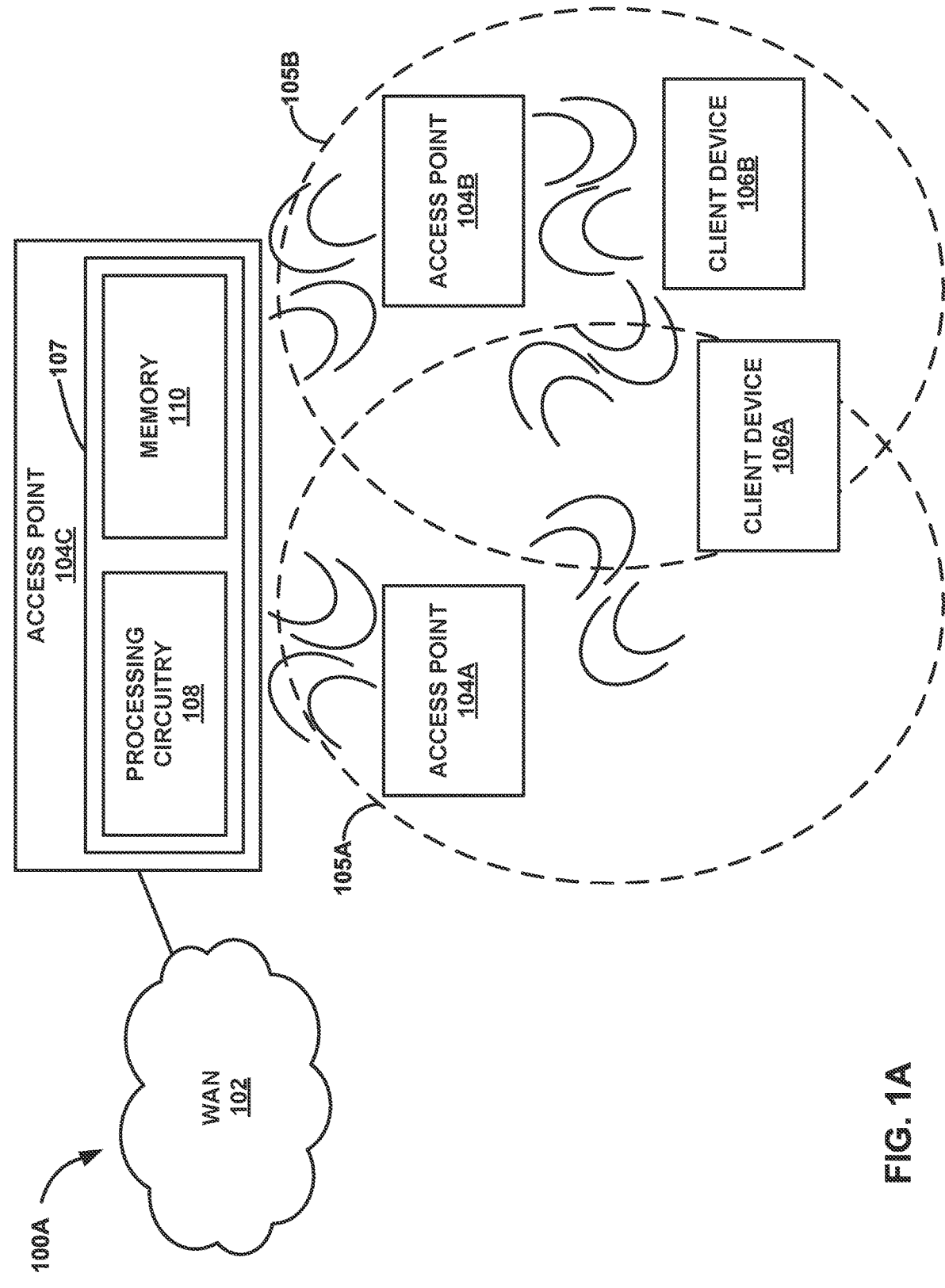
FIGS. 1A-1C are block diagrams illustrating example wireless network systems, in accordance with one or more techniques of this disclosure.

In general, this disclosure describes example techniques for creating network identifiers to differentiate service provider networks. For example, a service provider may manage a set of service provider networks. These service provider networks may represent community of networks each associated with a set of users and/or a set of client devices. More than one service provider network may, in some cases be associated with the same network name. One example of a network name is a service set identifier (SSID). Network names of wireless networks may be visible to a client device when the client device attempts to connect to a wireless network. In some examples, a client device may determine whether to connect to a wireless network at least in part based on the name of the network.

Each service provider network of the set of service provider networks may, in some examples, be associated with one or more access points. That is, to connect with a first service provider network, a client device may connect to a first access point. To connect with a second service provider network, the client device may connect to a second access point separate from the first access point. During a basic service set (BSS) selection phase, the client device may select the most suitable access point for connecting to a Wi-Fi network. This means that when a client device is within range of the first service provider network and the second service provider network, the client device may determine whether to connect to the first access point or the second access point during the BSS selection phase based on several criteria. These criteria may include signal strength associated with each access point, signal quality associated with each access point, security, network load, preferred networks of the client device, or any combination thereof.

In some examples, each service provider network of the set of service provider networks is associated with one or more subscribed client devices, a level of services provided, a range of wireless service, or any combination thereof. This means that it may be beneficial for a service provider and/or a client device for the client device not to connect or attempt to connect to a service provider network that the client device is not subscribed to. Since a client device may select an access point based on names of service provider networks within range of the client device during the BSS selection phase, and since two or more service provider networks may be associated with the same network name, a client device may mistakenly attempt to connect to the wrong service provider network during the BSS selection phase, include to a service provider network that the client device is not subscribed to.

For example, if a client device is to select between two service provider networks having the same network name, the client device may select a service provider network based on BSS selection phase criteria. This may cause the client device to mistakenly select a service provider network associated with the strongest signal or the highest-quality signal even when the client device is not subscribed to that service provider network. In other words, when two service provider networks associated with the same network name, a client device may attempt to connect to an access point based on BSS selection criteria even when it is more beneficial for the client device to connect with another access point.

This disclosure describes example techniques to append network names of service provider networks with unique information. In this manner, there may be a prevention of service interruptions, such as a decrease in a probability that a client device will mistakenly attempt to connect to a service provider network as compared with systems where two or more service provider networks are associated with the same network name that is not appended with unique identifiers. For example, in one or more examples described in this disclosure, a network identifier system may generate, for each service provider network of a set of service provider networks, a hash value based on service provider information elements associated with the service provider network. The hash value for each service provider network may distinguish the service provider network associated from other service provider networks, even when two or more service provider networks have the same name. In this example, appending the network name corresponding to each service provider network with the respective hash value may result in a set of appended network names that distinguish the set of service provider networks from each other.

Additionally, or alternatively, the network identifier system may append the network name associated with each service provider network with a network device address associated with a network device corresponding to the service provider network. Since each network device is associated with a unique address, appending network names with network device addresses may distinguish each service provider network from other service provider networks even when two or more service provider networks are associated with the same network name. In some examples, the network identifier system may append the network name corresponding to each service provider network with a random number that differentiates each service provider network from other service provider networks. In any case, appending network name corresponding to a service provider network with a network identifier that distinguishes the service provider network from other service provider networks may prevent client devices from experiencing service interruption at an edge between two service provider networks associated with the same name.

The techniques of this disclosure may provide one or more improvements to the computer-related field of computer networking that are integrated within a practical application. For example, a network system may generate unique network identifiers for each service provider network of a set of service provider networks so that even when two or more service provider networks have the same network name, each service provider network has a unique network identifier. This may decrease a probability that a client device will mistakenly attempt to connect to the wrong service provider network as compared with systems that do not generate unique network identifiers when two or more service provider networks have the same network name. Additionally, or alternatively, generating unique network identifiers may allow a client device to select networks with fewer service interruptions as compared with systems that do not generate unique network identifiers when two or more service provider networks have the same network name. That is, generating unique network identifiers may prevent a client device from transitioning between two networks having identical network names when information such as network load and service level cannot be identified by the client device based on the network name alone. The unique network identifiers allow the client device to select between available networks without mistakenly selecting a network that will cause a decrease in service quality.

Figure 1B:
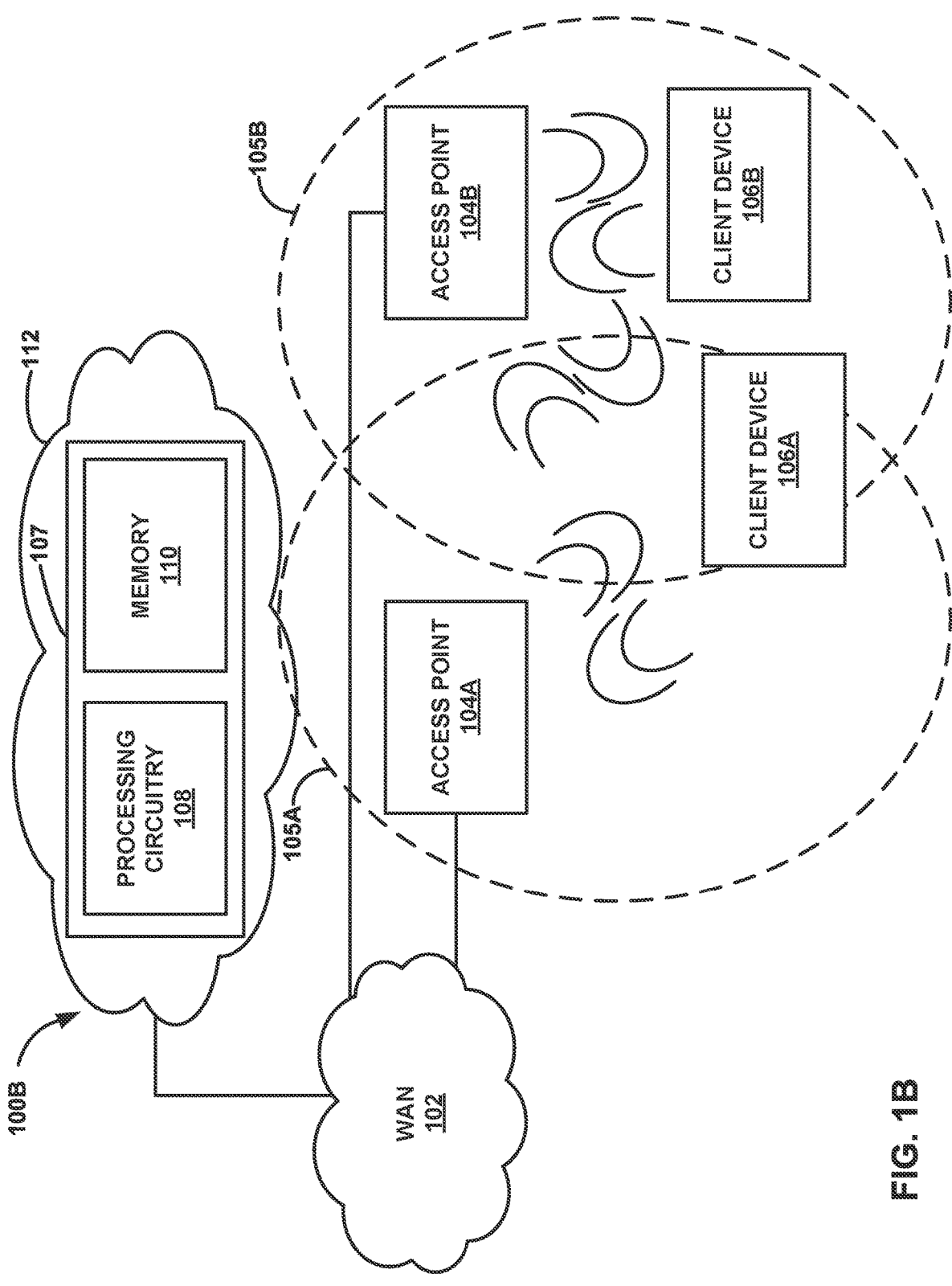
Figure 1C:
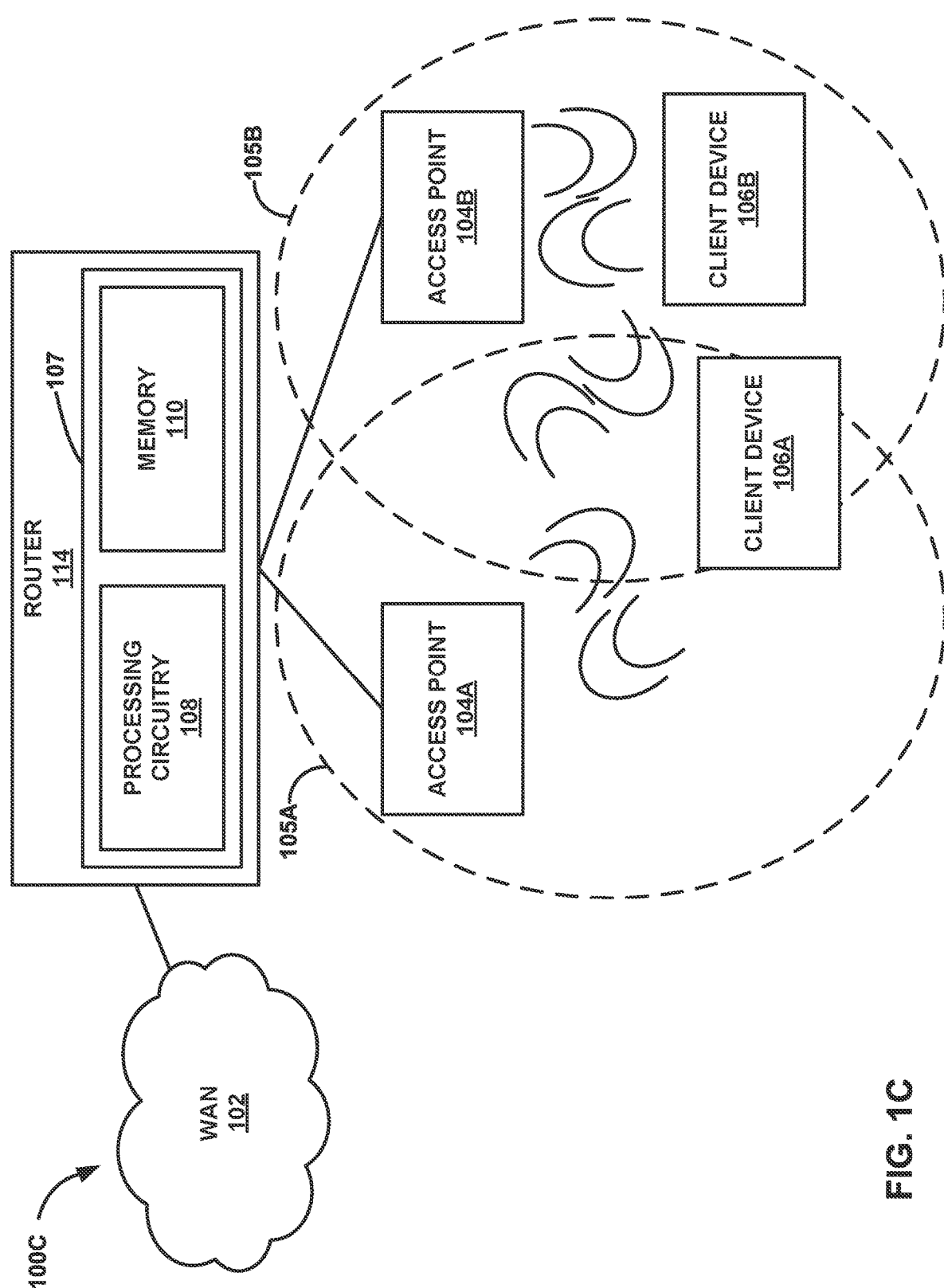

FIGS. 1A-1C are block diagrams illustrating example wireless network systems, in accordance with one or more techniques of this disclosure. For instance, FIGS. 1A-1C illustrate wireless network systems 100A-100C, respectively. Wireless network systems 100A-100C may be multi-node channelized wireless network systems, such as wireless network systems that operate in accordance with the Wi-Fi protocols. Wireless network systems 100A-100C may include wireless networks within a premise, such as a home, school, business, etc. However, the example techniques are not limited to requiring wireless network systems 100A-100C be located within a single premise, and may extend across multiple buildings.

Wireless network systems 100A-100C include wide area network (WAN) 102, access point 104A, access point 104B, service provider network 105A, service provider network 105B, access point 104C, client device 106A, client device 106B, and router 114, or a combination thereof. Access points 104A, 104B, 104C may be networking hardware devices that provide wireless connectivity to client devices 106A, 106B via service provider networks 105A, 105B. In some examples, access points may be referred to herein as "network devices." In some examples, routers may be referred to herein as "network devices."

Examples of access points 104A, 104B, 104C (collectively, "access points 104") include routers, extenders, repeaters, and the like. Examples of client devices 106A, 106B include subscriber devices that can communicate wirelessly such as computers, smartphones, smartwatches, tablet computing devices, Internet-of-Things (IoT) devices, and the like. Although, for simplicity of illustration, two access points 104A, 104B or three access points 104A, 104B, 104C are illustrated, two service provider networks 105A, 105B (collectively, "service provider networks 105") are illustrated, and two client devices 106A, 106B (collectively, "client devices 106") are illustrated, the example techniques are not so limited. There may be more or fewer access points 104, more or fewer service provider networks 105, and more or fewer client devices 106 than illustrated in FIGS. 1A-1C.

As illustrated in FIGS. 1A-1C, wireless network systems 100A-100C may include WAN 102. One example of WAN 102 is the Internet. For instance, as illustrated in FIG. 1A, access point 104C provides access to WAN 102 to other access points (e.g., access points 104A, 104B) and client devices 106A, 106B. In FIG. 1A, access point 104C may be considered as a gateway access point (e.g., AP-G). Access points 104A, 104B may be considered as repeater access points (e.g., AP-Rs). In FIG. 1B, both access points 104A, 104B may directly connect to WAN 102 and may both be considered AP-Gs.

In some examples, service provider networks 105A, 105B may be examples of local area networks (LANs). Each service provider network of service provider networks 105A, 105B may correspond to an access point of access points 104A, 104B. For example, service provider network 105A corresponds to access point 104A and service provider network 105B corresponds to access point 104B. That is, when a client device connects to access point 104A, the client device may connect to WAN 102 via service provider network 105A and when a client device connects to access point 104B, the client device may connect to WAN 102 via service provider network 105B.

As illustrated in FIG. 1C, router 114 provides access to WAN 102 to access points 104A, 104B and client devices 106A, 106B. Router 114 may be coupled to access points 104A, 104B through a cabled (e.g., wired) connection, such as fiber optic cable, Ethernet cable, twisted pair cable, coaxial cables, etc.). For instance, in an enterprise setting, router 114 may be coupled to access points 104A, 104B through a cabled connection, and access points 104A, 104B may communicate with respective client devices 106A, 106B wirelessly. However, it is possible for router 114 to communicate with access points 104A, 104B wirelessly as well.

Passpoint® is a Wi-Fi protocol that facilitates client devices in roaming between network hotspots. Passpoint® may allow client devices to discover hotspots, authenticate networks, provide encryption and security, and facilitate seamless roaming. It may be beneficial for client devices to identify access points and shift from one access point to another as network conditions change to facilitate seamless roaming. But it may also be beneficial for a client device to avoid unintended network connections to access points that a client device should not connect to. Unintended network connections may cause service degradation or interruption.

Passpoint® may deliver seamless, secure Wi-Fi connectivity to any network employing the Passpoint® protocol. A connection mode according to the Passpoint® protocol may be different than the connection mode associated with other wireless networks or protocols. Some wireless networks and protocols use SSID information to identify and/or distinguish different networks, or to determine whether a client device connects to the network. In general, networks using the Passpoint® protocol may use service provider identification information to distinguish networks. Regardless of whether an SSID corresponding to two different Passpoint® networks is the same, if service provider identification corresponding to the two different Passpoint® networks is the same, automatic access can be completed without any manual operation. Devices may use ANQP to obtain service provider identification information corresponding to one or more Passpoint® networks.

FIGS. 1A-1C illustrate network identifier system 107 including processing circuitry 108 and memory 110. As described in more detail, processing circuitry 108 (e.g., together with memory 110) may be configured to perform the example techniques described in this disclosure. Network identifier system 107 may be configured to generate unique network identifiers corresponding to each of service provider networks 105A, 105B so that even when service provider networks 105A, 105B are associated with the same network name, the network identifier corresponding to service provider network 105A is different from the network identifier corresponding to service provider network 105B. The techniques described herein are not limited to network identifier system 107 generating unique network identifiers. Access points 104 may generate unique network identifiers for service provider networks 105 in some cases.

Processing circuitry 108 may include fixed function circuitry and/or programmable processing circuitry. Processing circuitry 108 may include any one or more of a microprocessor, a controller, a digital signal processor (DSP), graphics processing unit (GPU), tensor processing unit (TPU), an application specific integrated circuit (ASIC), a field-programmable gate array (FPGA), or equivalent discrete or analog logic circuitry. In some examples, processing circuitry 108 may include multiple components, such as any combination of one or more microprocessors, one or more controllers, one or more DSPs, GPUs, TPUs, one or more ASICs, or one or more FPGAs, as well as other discrete or integrated logic circuitry, which may be physically located in one or more devices in one or more physical locations.

Processing circuitry 108 may be capable of processing instructions stored in memory 110. In some examples, memory 110 includes a computer-readable medium that includes instructions that, when executed by processing circuitry 108, cause network identifier system 107 and processing circuitry 108 to perform various functions attributed to them herein. Memory 110 may include any volatile, non-volatile, magnetic, optical, or electrical media, such as a random-access memory (RAM), read-only memory (ROM), non-volatile RAM (NVRAM), electrically erasable programmable ROM (EEPROM), ferroelectric RAM (FRAM), dynamic random-access memory (DRAM), flash memory, or any other digital media.

In some examples, processing circuitry 108 may be configured to identify, for each service provider network of service provider networks 105, information indicating a network name associated with the service provider network. Each access point of access points 104 may be associated with a service provider network of service provider networks 105. In some examples, the same service provider may administer each service provider network of service provider networks 105. That is, the service provider may administer more than one service provider network. Each service provider network may be associated with one or more users, a level of service, a level of network access, a type of service, or any combination thereof. In some examples, client device 106A may be subscribed to one or more service provider networks of service provider networks 105 and not be subscribed to one or more other service provider networks of service provider networks 105. In some examples, a client device may be subscribed to two or more service provider networks of service provider networks 105.

Each service provider network of service provider networks 105 may be associated with a network name such as a service set identifier (SSID). In some cases, two or more service provider networks of service provider networks 105 may be associated with the same network name. An SSID may be attached to packets in range of a service provider network such that client devices within the range of the service provider network may detect the service provider network. For example, access point 104A may output information indicative of an SSID corresponding to service provider network 105A and access point 104B may output information indicative of an SSID corresponding to service provider network 105B. Client device 106A may be within range of both of access point 104A and access point 104B and may detect both the SSID for service provider network 105A and the SSID for service provider network 105B. Client device 106B may be within range of access point 104B and not within range of access point 104A and may detect the SSID for service provider network 105B without detecting the SSID for service provider network 105A.

Processing circuitry 108 may append the network name corresponding to each service provider network of service provider networks 105 with a network identifier to generate a set of appended network names. One example of a network name is a service set identifier (SSID). Each appended network name of the set of appended network names may be different than each other appended network name of the set of appended network names. Accordingly, even when two or more of service provider networks 105 are associated with the same network name, the appended network names distinguish the two or more service provider networks from each other. For example, when service provider network 105A and service provider network 105B are associated with the same network name, the appended network name corresponding to service provider network 105A may be different than the appended network name corresponding to service provider network 105B. Service provider networks may, in some examples, represent LANs such as wireless local area networks (WLANs).

Each access point of access points 104 may be associated with a service provider network of service provider networks 105. For example, access point 104A may be associated with service provider network 105A and access point 104B may be associated with service provider network 105B. When a client device of client devices 106 is within range of a service provider network of service provider networks 105, the client device may receive information including the SSID associated with service provider network of the set of service provider networks 105. For example, client device 106A may receive information indicating an SSID of service provider network 105A and information indicating an SSID of service provider network 105B since client device 106A is within the range of both service provider network 105A and service provider network 105B. Client device 106B may receive information indicating an SSID of service provider network 105B since client device 106B is within the range of service provider network 105B. Since client device 106B is not within the range of service provider network 105A, client device 106B might not receive information indicating the SSID of service provider network 105A.

In some examples, more than one service provider network may have the same SSID. For example, a service provider may assign the same SSID to both service provider network 105A and service provider network 105B. In some examples, service provider network 105A and service provider network 105B may have the same SSID even when service provider network 105A and service provider network 105B are associated with different sets of users, different levels of service, different access privileges, or any combination thereof. This may cause a client device to mistakenly attempt to connect to the wrong service provider network based on more than one service provider network being associated with the same SSID.

During a basic service set (BSS) selection phase, a client device of client devices 106 may select an access point of access points 104 to connect to. For example, access point 104A and access point 104B may both be available for client devices to connect to. A client device such as client device 106A may be configured to identify a set of access points that are available to connect to. For example, client device 106A may determine that access point 104A and access point 104B are within range of client device 106A and are available for client device 106A to connect to. During the BSS selection phase, client device 106A may evaluate several criteria to determine whether to connect to access point 104A or connect to access point 104B. These criteria may include a signal strength corresponding to each access point, a signal quality corresponding to each access point, a security of each access point, a network load corresponding to each access point, one or more preferred networks of client device 106A, or any combination thereof.

When service provider network 105A and service provider network 105B are associated with the same network name, this may cause client device 106A to select one of service provider network 105A and service provider network 105B to connect to without considering whether client device 106A is subscribed to each of service provider network 105A and service provider network 105B. In other words, even though service provider network 105A and service provider network 105B are associated with the same network name, it may be the case that client device 106A is subscribed to one of service provider network 105A and service provider network 105B but not the other. During the BSS selection phase, client device 106A may identify networks based on the network name without considering other information. This means that when two service provider networks have the same network name, this may cause a client device to improperly select one of the networks based on one or more BSS selection criteria such as signal strength without considering that the client device is not subscribed to the network.

Processing circuitry 108 of network identifier system 107 may append, for each service provider network of service provider networks 105, a network name corresponding to the service provider network with a network identifier to generate a set of appended network names. Each appended network name of the set of appended network names may be different than each other appended network name of the set of network names. This means that the set of appended network names may distinguish the service provider networks 105 from each other even when two or more of service provider networks 105 have the same network name. For example, network identifier system 107 may identify a network identifier for service provider network 105A that distinguishes service provider network 105A from other service provider networks and create a network identifier for service provider network 105B that distinguishes service provider network 105B from other service provider networks. Even when service provider network 105A and service provider network 105B have the same network name (e.g., SSID), the network identifier for each of service provider network 105A and service provider network 105B may distinguish service provider network 105A and service provider network 105B from each other.

Since processing circuitry 108 of network identifier system 107 may, in some examples, append the network name associated with service provider network 105A with a network identifier corresponding to service provider network 105A and append a network name associated with service provider network 105B with a network identifier corresponding to service provider network 105B, the resulting appended network names may distinguish service provider network 105A and service provider network 105B. That is, the appended network name corresponding to service provider network 105A may be different from the appended network name corresponding to service provider network 105B even when the network name is the same for service provider network 105A and service provider network 105B.

During the BSS selection phase, client device 106A may identify that the appended network name corresponding to service provider network 105A is different than the appended network name corresponding to service provider network 105B. Client device 106A may consequently select one of access point 104A and access point 104B based on information stored by the client device 106A identifying one or more service provider networks that client device 106A is subscribed to. Even when BSS selection criteria indicate that access point 104B is associated with a stronger or higher quality signal, client device 106A may select access point 104A when client device 106A determines that it is subscribed to service provider network 105A and is not subscribed to service provider network 105B. Appending the network name corresponding to service provider network 105A with a first network identifier and appending the network name corresponding to service provider network 105B with a second network identifier may allow client device 106A to distinguish service provider network 105A and service provider network 105B during the BSS selection phase.

In some examples, processing circuitry 108 is configured to apply, for each service provider network of service provider networks 105, a hash function to service provider information elements corresponding to the service provider network. Each service provider network of service provider networks 105 may correspond to an access point of access points 104. Each service provider network of service provider networks 105 may be associated with a network name such as an SSID. In some examples, each service provider network of service provider networks 105 may be associated with a set of service provider information elements in addition to a network name. Even when two service provider networks have the same network name, the service provider information elements corresponding to each of the two service provider networks may distinguish the two service provider networks. This means that when processing circuitry 108 applies the hash function to service provider information elements corresponding to each of the two service provider networks 105, processing circuitry 108 may generate hash values for service provider network 105A and service provider network 105B that are different, even when service provider network 105A and service provider network 105B have the same network name (e.g., SSID).

Processing circuitry 108 may append the network name corresponding to service provider network 105A with the hash value generated based on the service provider information elements corresponding to service provider network 105A and append the network name corresponding to service provider network 105B with the hash value generated based on the service provider information elements corresponding to service provider network 105B. This may cause the appended network name associated with service provider network 105A to be different than the appended network name associated with service provider network 105B. Client devices within range of access point 104A may receive information indicating the appended network name associated with service provider network 105A and client devices within range of access point 104B may receive information indicating the appended network name associated with service provider network 105B.

Processing circuitry 108 is not limited to generating hash values to distinguish service provider networks 105. In some examples, processing circuitry 108 may append the network name corresponding to each service provider network of service provider networks 105 with an address associated with the access point associated with the service provider network. For example, each access point of access points 104 may be associated with an address, such as a basic service set identifier (BSSID). While a single SSID may be associated with more than one access point and more than one service provider network, each access point of access points 104 may be associated with an a BSSID that is different than the BSSID of each other access point of access points 104. In some examples, the BSSID corresponding to each access point of access points 104 may comprise a media access control (MAC) address that identifies the access point as an individual device within a network.

Network systems 100A-100C of FIGS. 1A-1C are not limited to network identifier system 107 generating hash values corresponding to service provider networks 105. In some examples, each access point of access points 104 is configured to generate a hash value for a service provider network corresponding to the access point according to one or more techniques described herein. For example, access point 104A may generate a hash value for service provider network 105A based on service provider information elements corresponding to service provider network 105A and access point 104B may generate a hash value for service provider network 105B based on service provider information elements corresponding to service provider network 105B. Access point 104A may append a network name corresponding to service provider network 105A with the hash value for service provider network 105A and access point 104B may append a network name corresponding to service provider network 105B with the hash value for service provider network 105B. Since service provider network information is available to both access points 104 and network identifier system 107, generating hash values for service provider networks 105 may be a useful technique for generating unique network identifier on either a centralized or a decentralized basis.

By appending the network name corresponding to each service provider network of service provider networks 105 with an address associated with the access point of access points 104 associated with the service provider network, processing circuitry 108 may distinguish each service provider network of service provider networks 105 from other service provider networks. For example, the appended network name corresponding to service provider network 105A may include the address corresponding to access point 104A and the appended network name corresponding to service provider network 105B may include the address corresponding to access point 104B. This means that the appended network name corresponding to service provider network 105A is different from the appended network name corresponding to service provider network 105B even when service provider network 105A and service provider network 105B have the same network name.

In some examples, processing circuitry 108 may append the network name corresponding to each service provider network of service provider networks 105 with a random network identifier. For example, processing circuitry 108 may generate a random network identifier (e.g., a random number, a random string of characters) corresponding to each service provider network of service provider networks 105. Processing circuitry 108 may append the network name corresponding to each service provider network of service provider networks 105 with the random network identifier generated for the service provider network. This means that even when service provider networks 105 have the same network name, each service provider network of service provider networks 105 may be distinguished from other service provider networks with a random network identifier.

In some examples, each access point of access points 104 may be configured to communicate with one or more client devices that are within a range of the access point. For example, access point 104A may be configured to communicate with client device 106A and access point 104B may be configured to communicate with client device 106A and client device 106B. In some examples, client device 106B may be outside of a range of access point 104A such that client device 106B cannot wirelessly communicate with access point 104A.

Each client device of client devices 106 may, in some examples, output one or more access network query protocol (ANQP) queries to identify one or more service provider networks within range of the client device. In some examples, each access point of access points 104 may receive one or more ANQP queries and output one or more responses to ANQP queries. For example, access point 104A may receive one or more ANQP queries from client device 106A and output one or more responses to client device 106A, access point 104B may receive one or more ANQP queries from client device 106A and output one or more responses to client device 106A, and access point 104B may receive one or more ANQP queries from client device 106B and output one or more responses to client device 106B. This means that client device 106A may discover both of the service provider network 105A corresponding to access point 104A and the service provider network 105B corresponding to access point 104B and client device 106B may discover the service provider network 105B corresponding to access point 104B without discovering service provider network 105A.

By sending ANQP queries and receiving responses from access points 104, client devices 106 may discover a wide range of information about service provider networks 105, including service provider information elements such as domain name lists, organization identifiers (OIs), and network access identifier (NAI) realms that distinguish between service provider network 105A and service provider network 105B. But during the BSS selection phase, client devices 106 may be configured to transition between access points 104 based on network names associated with service provider networks 105, in some cases without considering service provider network information elements discovered via ANQP queries.

In some examples, it may be beneficial for network identifier system 107 to distinguish service provider network 105A and service provider network 105B so that a client device of client devices 106A are configured to choose whether to connect to service provider network 105A or service provider network 105B during the BSS selection phase when the client device is within range of both networks. For example, it may be beneficial for client device 106A to connect to the service provider network 105A via access point 104A and not to connect to service provider network 105B via access point 104B. This is because service provider networks 105 may provide different levels of service, different privileges, different levels of access, or any combination thereof. Consequently, even when client device 106A is within range of both access points 104, it may be beneficial for client device 106A not to attempt to connect to access point 104B, even when BSS selection criteria indicate that access point 104B has a stronger or higher quality connection with client device 106A than access point 104A has with client device 106A.

When service provider networks 105 are each associated with a network identifier that distinguishes the service provider network from other service provider networks, each of client devices 106 may be configured to select the correct access point to connect to when more than one access point is within range. For example, client device 106A may select access point 104A instead of selecting access point 104B based on the appended network name associated with each of service provider networks 105. That is, by appending the network name with a network identifier for each of service provider networks 105, network identifier system 107 may prevent client device 106A from mistakenly attempting to connect to access point 104B.

In some examples, client device 106A may have access to both of service provider networks 105 and it may be beneficial for client device 106A to roam between service provider network 105A and service provider network 105B. By creating a unique appended network name for each of service provider networks 105, network identifier system 107 may allow client device 106A to identify that client device 106A has access to each of service provider networks 105, and allow client device 106A to roam between service provider networks 105 as needed. Appending network names corresponding to service provider network 105A and service provider network 105B may be beneficial for improving an ability of client device 106A to roam between service provider network 105A and service provider network 105B, because client device 106A is better able to determine that client device 106A is subscribed to both service provider network 105A and service provider network 105B and transition when necessary as compared with systems that do not append network names.

Even when client device 106A is subscribed to both service provider network 105A and service provider network 105B, it may be beneficial for client device 106A not to transition from service provider network 105A to service provider network 105B when the service level and network loads corresponding to each of service provider network 105A and service provider network 105B indicate that service provider network 105A is more suitable. Since characteristics such as service level and network load may not be discernible based on network name alone, it may be beneficial to generate unique network identifiers for each of service provider network 105A and service provider network 105B to prevent handoff roaming resulting from identical network names.

Figure 2:
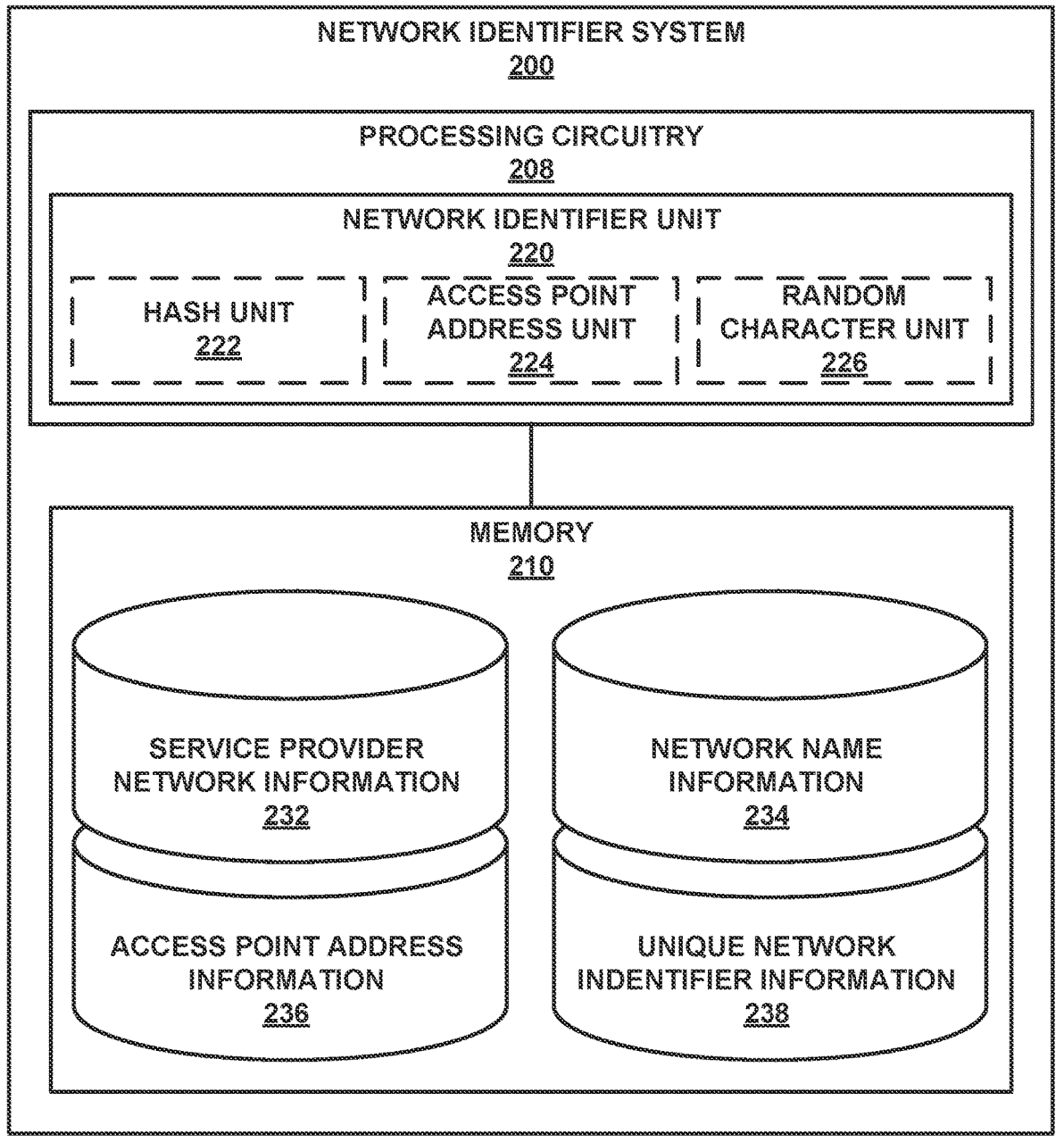
FIG. 2 is a block diagram illustrating an example network identifier system, in accordance with one or more techniques of this disclosure.

FIG. 2 is a block diagram illustrating an example network identifier system 200, in accordance with one or more techniques of this disclosure. As seen in FIG. 2, network identifier system 200 may include processing circuitry 208, memory 210 and network identifier unit 220. Network identifier unit 220 may include hash unit 222, access point address unit 224, and random character unit 226. Memory 210 may include service provider network information 232, network name information 234, access point address information 236, and unique network identifier information 238. In some examples, network identifier system 200 may be an example of network identifier system 107 of FIGS. 1A-1C. In some examples, processing circuitry 208 may be an example of processing circuitry 108 of FIGS. 1A-1C. Memory 210 may be an example of memory 110 of FIGS. 1A-1C.

Network identifier system 200 may be configured to create, for each service provider network of a set of service provider networks, a network identifier that distinguishes the service provider network of the network device from other service provider networks corresponding to the same service provider. This is because a single service provider may administer more than one service provider network each associated with one or more access points. Although more than one service provider network may be associated with the same service provider, each service provider network may be associated with different sets of users, services, privileges, levels of access, or any combination thereof. This means that it may be beneficial for network identifier system 200 to distinguish between service provider networks associated with the same service provider.

Some wireless network systems use SSID information to identify different wireless networks, or to determine whether a mobile device can connect to the network. In some examples, a wireless network system may use service provider identification information in addition to or alternatively to SSID information to distinguish different networks. That is, regardless of an SSID value corresponding to a service provider network, client devices may connect to a network based on service provider information associated with the network automatically without any manual input from a user.

Client devices may use ANQP queries to retrieve service provider information corresponding to one or more service provider networks. In some examples, a connection manager within the client device may compare the information obtained from an access point corresponding to a service provider network to configuration information stored in the client device to determine whether to attempt to connect to the service provider network. In some examples, service provider information may include a service provider domain name, an NAI realm, an OI, or any combination thereof.

When a density of deployed access points is large, if different service providers use the same SSID for service provider networks or a single service provider uses the same SSID for more than one service provider network, client devices 106 of FIGS. 1A-1C may incorrectly connect or attempt to connect to one or more access points at the edge of the network. In some examples when more than one service provider network within range of client device 106A is associated with the same SSID, client device 106A may incorrectly connect or attempt to connect to an access point even when the more than one service provider networks within range of client device 106A have unique identifiers such as domain names and access privileges. In some examples, when a client device of client devices 106 incorrectly, erroneously, or mistakenly connects or attempts to connect to an access point, this may be referred to as an "unintended connection."

Since some network systems rely on service provider information to identify service provider networks without relying on SSID information, large service providers may differentiate one or more sub-networks administered by the service provider (e.g., community networks) using different service provider information. In some examples, a single service provider may administer a first service provider network and a second service provider network. The service provider may assign different service provider identifiers (e.g., service provider domain names, OIs, and NAIs) to distinguish between the two service provider networks, ensuring that a client device of client devices 106 does not connect to a service provider network associated with service provider identifiers that are different than service provider identifiers stored by the client device. In some examples, both of the first service provider network and the second service provider network are associated with the same SSID. In some examples, the first service provider network may represent service provider network 105A of FIGS. 1A-1C and the second service provider network may represent service provider network 105B of FIGS. 1A-1C. The SSID and service provider information associated with the first service provider network and the second service provider network are illustrated below for reference in Table 1.

TABLE 1

| | Community blue | Community yellow |
| --- | --- | --- |
| HS2.0 Indication element | present | present |
| SSID | Passpoint-WiFi | Passpoint-WiFi |
| Domain Name List | blue.orange.com | yellow.orange.com |
| OIs | 001d2e | 001bc50050 |
| NAI Realms | blue.orange.com | yellow.orange.com |

In some examples, "Community blue" of Table 1 may represent the first service provider network and "Community yellow" of Table 1 may represent the second service provider network. Community blue and Community yellow may, in some cases, represent community networks. As seen in Table 1, Community blue and Community yellow have the same hotspot 2.0 (HS2.0) indication element, "present." Community blue and Community yellow may be associated with the same SSID, "Passpoint-WiFi." Community blue and Community yellow may have different domain name lists, different OIs, and different NAI realms. For example, as seen in Table 1, Community blue is associated with the domain name list "blue.orange.com" and Community yellow is associated with the domain name list "yellow.orange.com," Community blue is associated with the OI "001d2e" and Community yellow is associated with the OI "001bc50050," and Community blue is associated with the NAI realm "blue.orange.com" and Community yellow is associated with the NAI realm "yellow.orange.com."

A client device may, in some cases, be a subscriber of the service provider network Community blue. For example, the client device may be an example of client device 106A of FIGS. 1A-1C, Community blue may be an example of service provider network 105A of FIGS. 1A-1C, and Community yellow may be an example of service provider network 105B of FIGS. 1A-1C. Client device 106A may be located in an area where signals corresponding to both of service provider network 105A and service provider network 105B are configured to reach client device 106A. That is, client device 106A may be located in an area where client device 106A is able to communicate with access point 104A corresponding to service provider network 105A and communicate with access point 104B corresponding to service provider network 105B. In some examples, client device 106A may be located closer to access point 104B than to access point 104A. Client device 106A may, in some cases, be provisioned with data as shown in the following table.

TABLE 2

| FQDN | blue.orange.com |
| --- | --- |
| NAI realms | blue.orange.com |

As seen in Table 2, Client device 106A may be provisioned with the fully qualified domain name (FQDN) "blue.orange.com" and the NAI realm "blue.orange.com." Since client device 106A is a subscriber of Community blue, client device 106A may be provisioned with the same domain name and NAI realms that are also associated with the service provider network Community blue. In some examples, client device 106A may also store the information of Table 1 that indicates the SSID and service provider information corresponding to Community blue and Community yellow in a memory based on obtaining the information via ANQP queries. The information stored by client device 106A may indicate that Community blue and Community yellow are matched target networks. In some examples, client device 106A may obtain the information of Table 1 via ANQP queries sent to access points 104A, 104B.

When client device 106A is ready to connect to a network, client device 106A may send ANQP messages to probe nearby service provider networks and match these networks with service provider networks pre-stored in client device 106A. If client device 106A discovers a service provider network that matches a network stored in client device 106A, client device 106A may select a basic service set (BSS) corresponding to a network device associated with the network from a priority group based on a scan result. Client device 106A may subsequently initiate an association and connect to the selected network. If client device 106A does not find a matching network, client device 106A might not initiate an association.

When client device 106A is within signal range of both the service provider network 105A (e.g., "Community blue") and service provider network 105B (e.g., "Community yellow), client device 106A may scan surrounding signals using ANQP messages and discover that both Community blue and Community yellow have are associated with the same SSID "Passpoint-WiFi." In some examples, client device 106A may determine that the common SSID "Passpoint-WiFi" associated with both networks matches pre-existing service provider identification information stored by client device 106A. When the client device 106A uses SSID information to perform BSS selection, this may cause client device 106A to mistakenly connect or attempt to connect with the wrong service provider network when two or more service provider networks share the same SSID.

For example, after client device 106A uses ANQP messages to match a target service provider network having the SSID "Passpoint-WiFi," client device 106A may filter BSS according to the target network. If client device 106A receives a BSS signal from Community yellow with stronger signal compared to the BSS signal of Community blue, client device 106A may mistakenly connect to Community yellow due to both networks having the same SSID and Community yellow being associated with the stronger BSS signal. Mistaken connections may lead to poor user experience caused by a client device reconnecting to an unknown network or being unable to connect to a network it is not subscribed to.

In some examples, client devices 106 may not use SSID for network selection during the network selection phase when a globally unified authority to manage these SSID does not exist. However, client devices 106 may use SSIDs during a BSS selection phase to facilitate seamless handoffs between service provider networks. For example, when client device 106A moves from a location within range of access point 104A and not within range of access point 104B to a location within range of both access point 104A and access point 104B, client device 106A may evaluate SSIDs associated with service provider network 105A and service provider network 105B to determine whether to attempt to connect to service provider network 105B. This means that mistaken connections may occur when client devices 106 are located at an edge or an overlap between networks with the same SSID.

In one or more examples described in this disclosure, network identifier system 200 may create a network identifier that distinguishes each service provider network of a set of service provider networks from each other service provider network of the set of service provider networks. Network identifier system 200 may append the SSID corresponding to each service provider network with the network identifier so that each appended SSID is unique. This may prevent client devices 106 from mistakenly connecting to a network (e.g., during BSS selection) because two or more networks having the same SSID. Network identifier system may include hash unit 222, access point address unit 224, random character unit 226, or any combination thereof. Each of hash unit 222, access point address unit 224, and random character unit 226 may be configured to create a network identifier for each service provider network of a set of service provider networks.

Hash unit 222 may, in some examples, be configured to create a network identifier that distinguishes each service provider network of a set of service provider networks by generating a hash value based on service provider information corresponding to each service provider network of the set of service provider networks. In some examples, even when two service provider networks are associated with the same SSID, the two service provider networks may be associated with different service provider information and/or different service provider identifiers. Hash unit 222 may append the SSID for each of the two service provider networks with the hash value generated based on the different service provider information and/or different service provider identifiers so that the appended SSID of the first service provider network is different than the appended SSID of the second service provider network.

Hash unit 222 may be configured to create a network identifier corresponding to each service provider network of the set of service provider networks based on service provider network information 232 and network name information 234. In some examples, each service provider network of the set of service provider networks may be associated with one or more service provider information elements stored in memory 210 as part of service provider network information 232. The one or more service provider information elements corresponding to each service provider network may be different than the one or more service provider information elements corresponding to each other service provider network.

Network name information 234 may include information indicating a network name associated with each service provider network of the set of service provider network. In some examples, a network name may comprise an SSID, but this is not required. Two or more service provider networks may be associated with the same network name. Since the service provider information elements corresponding to each service provider network may be different than the service provider information elements corresponding to each other service provider network, hash unit 222 may generate a unique value for each service provider network based on service provider network information 232.

In the example of Table 1 service provider network 105A (e.g., Community blue) may be associated with the domain name list "blue.orange.com" and service provider network 105B (e.g., "Community yellow") is associated with the domain name list "yellow.orange.com," Community blue is associated with the OI "001d2e" and Community yellow is associated with the OI "001bc50050," and Community blue is associated with the NAI realm "blue.orange.com" and Community yellow is associated with the NAI realm "yellow.orange.com." Using hash unit 222 to generating hash functions for Community blue and Community yellow using the domain name lists, OIs, and NAI realms may result in different hash values. This means that even though Community blue and Community yellow are associated with the same SSID, the SSID appended with the hash value for Community blue is different than the SSID appended with the hash value for Community yellow.

When two service provider networks have the same SSID, appending the SSID with hash values generated using service provider information and/or service provider identifiers may decrease a probability that a client device of client devices 106 will mistakenly connect or attempt to connect to the wrong network at an edge between the two service provider networks associated with the same SSID. Service provider information may include many fields each including long strings of data as domain names, OIs, NAI realms, or any combination thereof. This means that it may be beneficial for hash unit 222 to generate hash values based on the service provider information, because hash values include be significantly fewer characters than the service provider information itself. Hash unit 222 may be configured to use one or more different hash algorithms, such as message-digest algorithm 5 (MD5), secure hashing algorithm (SHA), BLAKE, or any combination thereof.

Hash functions process input data to generate an output string. In some cases, a hash function may be configured to accept input strings of varying length, but generate an output string that is the same length for any input string. A hash function may, in some cases, always generate the same output string for the same input string. The hash function may generate different output strings for different input strings. This means that when service provider information for two different service provider networks is different, a hash function may output different hash values based on processing the different service provider information. In some examples, hash unit 222 may generate hash values that are not particularly complex or lengthy. This may involve generating an initial hash value based on the input string, and using a shortening algorithm to shorten the initial hash value to the value that is appended to the SSID.

In some examples, a client device (e.g., client device 106A) may be located at an edge or an overlap between two service provider networks associated with the same SSID and managed by the same service provider. The two service provider networks may include service provider network 105A (e.g., "Community blue") corresponding to access point 104A and service provider network 105B (e.g., "Community yellow) corresponding to access point 104B. In this example, Community blue and Community yellow may be associated with the following information.

TABLE 3

|  | Community blue | Community yellow |
|---|---|---|
| HS2.0 Indication element | present | present |
| SSID | Passpoint-WiFi | Passpoint-WiFi |
| Domain Name List | blue.orange.com | yellow.orange.com |
| OIs | 001d2e | 001bc50050 |
| NAI Realms | blue.orange.com | yellow.orange.com |
| Final SSID | Passpoint-WiFi-9wDcA | Passpoint-WiFi-1BMso |

Table 3 includes the same information as Table 1, except that Table 3 includes a final SSID for each of Community blue and Community yellow. The final SSID for each of Community blue and Community yellow may represent the SSID "Passpoint-WiFi" appended with a hash value generated based on the domain name list, OI and NAI realm of the respective network. For example, the domain name, OI and NAI realm for each of Community blue and Community yellow may be included as part of service provider network information 232 that hash unit 222 uses to generate hash values.

In some examples, for the network Community blue, hash unit 222 may use the domain name list "blue.orange.com", the OI "001d2e" and the NAI realm "blue.orange.com" to generate the hash value "9wDcA". Hash unit 222 may append the SSID "Passpoint-WiFi" with the hash value "9wDcA" to create the final SSID "Passpoint-WiFi-9wDcA." For the network Community yellow, hash unit 222 may use the domain name list "yellow.orange.com", the OI "001bc50050" and the NAI realm "yellow.orange.com" to generate the hash value "1BMso". Hash unit 222 may append the SSID "Passpoint-WiFi" with the hash value "1BMso" to create the final SSID "Passpoint-WiFi-1BMso." Consequently, hash unit 222 creates final SSIDs for Community blue and Community yellow that are different and distinguish these networks from each other, even though Community blue and Community yellow are associated with the same SSID.

When a client device such as client device 106A selects a basic service set based on the final SSID corresponding to each respective service provider network, client device 106A may avoid mistakenly connecting with the wrong service provider network since the final SSID for each network distinguishes that network from other networks. For example, since the final SSID "Passpoint-WiFi-9wDcA" is associated with Community blue and "Passpoint-WiFi-1BMso" is associated with Community yellow, client device 106A can select the basic service set corresponding to access point 104A and service provider network 105A (Community blue) based on client device 106A determining that it is subscribed to service provider network 105A that is associated with the final SSID "Passpoint-WiFi-9wDcA" and not subscribed to service provider network 105B that is associated with the final SSID "Passpoint-WiFi-1BMso." Since Community yellow is associated with a final SSID "Passpoint-WiFi-1BMso" that is different than the final SSID "Passpoint-WiFi-9wDcA" associated with Community blue, this may prevent client device 106A from mistakenly selecting a basic service set corresponding to Community yellow.

In some examples, a service provider may manage two different community networks that not only have the same SSID, but also are associated with the same OI. That is, more than one service provider may be associated with the same OI in some examples other than the example of Table 3, where Community blue and Community yellow have the same OI. In some examples, Community blue and Community yellow may be associated with the same OI, and it may be beneficial for one or more of client devices 106 to roam between Community blue and Community yellow. In this example, Community blue and Community yellow may be associated with the following information.

TABLE 4

|  | Community blue | Community yellow |
|---|---|---|
| HS2.0 Indication element | present | present |
| SSID | Passpoint-WiFi | Passpoint-WiFi |
| Domain Name List | blue.orange.com | yellow.orange.com |
| OIs | 001d2e | 001d2e |
| NAI Realms | blue.orange.com | yellow.orange.com |
| Final SSID | Passpoint-WiFi-9wDcA | Passpoint-WiFi-27ac5 |

Table 4 may be substantially the same as table 3, except that Community yellow is associated with the OI "001d2e" instead of the OI "001bc50050" and Community yellow is associated with the final SSID "Passpoint-WiFi-27ac5" instead of the final SSID "Passpoint-WiFi-1BMso." This means that in the example of table 4, Community yellow and Community blue are associated with the same OI "001d2e." But since the domain name list for Community blue is different than the domain name list for Community yellow and the NAI realm for Community blue is different than the domain name list for Community yellow, the hash values generated to append the common SSID are different for Community yellow and Community blue because some of the service provider network information is different even though OIs are the same.

When the OI identifier "001d2e" is the same for both Community blue and Community yellow, this means that this means that one or more client devices of client devices 106 associated with the OI identifier "001d2e" can roam between the two different networks. Using hash unit 222 to generate final SSIDs for Community blue and Community yellow is beneficial because client devices of client devices 106 that are not signed up for the OI "001d2e" but are signed up for the community domain names blue.orange.com and/or yellow.orange.com may experience unintended connection issues at the edge of Community blue and Community yellow when SSIDs are the same for Community blue and Community yellow. When hash unit 222 uses a hash function to generate final SSID "Passpoint-WiFi-9wDcA" for Community blue and generate final SSID "Passpoint-WiFi-27ac5" for Community yellow, a client device of client devices 106 that subscribes to OI identifier "001d2e" may discover that Community blue and Community yellow are available for connection based on these networks being associated with different final SSIDs. The client device of client devices 105 may discover the final SSIDs associated with Community blue and Community yellow via an OI identifier in a beacon or via ANQP messages. This means that client devices of client devices 106 subscribing to OI identifier "001d2e" may roam between Community blue and Community yellow.

To process service provider information to generate a hash function, hash unit 222 may organize service provider information into an input string. For example, service provider elements may be arranged according to an order of elements, with elements being left empty if a set of service provider information does not include information corresponding to the element. For example, hash unit 222 may place service provider information into an input string according to the following order: (1) OI, (2) domain name list, (3) NAI realm. The techniques of this disclosure are not limited to any one order. Hash unit 222 may organize service provider information into an input string according to any order.

In some examples, service provider information elements may include multiple strings, and hash unit 222 determines the input string sequence based on the length of the strings from small to large and arrange the elements in the order of the American standard code for information interchange (ASCII) character table. In some examples, when hash unit 222 applies a hash function to an input data string to generate an output data string, the output data string may comprise a binary number of 128 bits or 256 bits. Hash unit 222 may, in some examples, convert the binary number into readable characters (e.g., numbers, upper case letters, lower case letters). In some examples, hash unit 222 may shorten the string of readable characters into a final, shorter string of readable characters for appending to the SSID. Hash unit 222 may append the SSID with the shorter string of readable characters. In some examples, the shorter string of readable characters is referred to as a "hash value." Hash unit 222 may append the SSID associated with a service provider network with the hash value generated based on the service provider information to create the final SSID.

Hash unit 222 may create an input string for processing to generate an output string by arranging a set of service provider information elements into a string of characters. For example, the below table 5 indicates an SSID and service provider information elements associated with an example service provider network, community green.

TABLE 5

| | Community green |
| --- | --- |
| HS2.0 Indication element | Present |
| SSID | Passpoint-WiFi |
| Domain Name List | k-green.orange.com, h-green.orange.com |
| OIs | 001d2e, 001bc50050 |
| NAI Realms | k-green.orange.com, h-green.orange.com |
| Final SSID | Passpoint-WiFi-gmGU4 |

As seen in table 5, Community green is associated with the SSID "Passpoint-WiFi." Community green is associated with two domain name lists, "k-green.orange.com" and "h-green.orange.com" which each represent a service provider information element. Community green also is associated with two OIs, "001d2e and "001bc50050" and two NAI realms "k-green.orange.com" and "h-green.orange.com". The two domain name lists, the two OIs, and the two NAI realms amount to six individual service provider information elements that hash unit 222 is configured to arrange into an input string.

In some examples, hash unit 222 is configured to arrange the two OIs in order with the shorter OI being placed first. After the two OIs, hash unit 222 may place the two domain name lists in alphabetical order since the lengths of the two domain names are the same. For example, hash unit 222 may arrange the domain name starting with 'h' before the domain name starting with 'k.' based on alphabetical order. After the domain name strings, hash unit 222 may place the NAI realms in alphabetical order since the lengths of the NAI realms are the same. When hash unit 222 places the service provider information elements are placed in order, the input string may appear as "001d2e,001bc50050,h-green.orange.

com,k-green.orange.com,h-green.orange.com,k-green.or-ange.com,". Each service provider element may be separated by a comma.

Hash unit 222 may apply a hash function to generate an output string based on the input string. For example, when hash unit 222 applies the SHA-256 hash function to the input string "001d2e,001bc50050,h-green.orange.com,k-green.o-range.com,h-green.orange.com,k-green.orange.com," the resulting output string may include "e6a068c9162b4-29a6bdde5d3df5926a0882a86d691b47640498fdf32e04c4-e45." Hash unit 222 is not limited to using the SHA-256 hash function. Hash unit 222 may use any hash function to generate the output string.

Hash unit 222 may apply a shortening function to the output string to generate a shortened version of the output string "gmGU4." In some examples, hash unit 222 may use the base62 algorithm as the shortening function, but this is not required. Hash unit 222 may use any shortening function to shorten the string generated by the hash function. Hash unit 222 may append the shortened version of the output string to the SSID to generate the final SSID "Passpoint-WiFi-gmGU4." Hash unit 222 may be configured to control the length of the shortened version of the output string. For example, hash unit 222 may cause the shortened version of the output string to be longer to decrease risk of "collisions" that occur when two inputs result in the same output. Hash unit 222 may cause the shortened version of the output string to be longer to make the final SSID more compact and easier to read.

Network identifier system 200 is not limited to using hash unit 222 to create network identifiers for distinguishing service provider networks that share the same SSID. Access point address unit 224 of network identifier unit 220 may create, for each service provider network of a set of service provider networks, a network identifier that distinguishes the service provider network from other service provider networks of the set of service provider networks. For example, each service provider network of the set of service provider networks may be associated with one or more access points. A network device, such as an access point (e.g., access point 104A), may be associated with one or more internet protocol (IP) addresses, MAC addresses, or other kinds of addresses that distinguish the network device from other network devices. Access point address information 236 may include information indicating one or more addresses corresponding to network devices of the set of service provider networks. Access point address unit 224 may use access point address information 236 to create network identifiers for distinguishing service provider networks.

In some examples, access point address information 236 may include a BSSID corresponding to each access point of a set of access points that are associated with one or more of the set of service provider networks. Although two or more service provider networks may be associated with the same SSID, each access point may be a unique BSSID. This means that when a first service provider network and a second service provider network are associated with the same SSID, an access point corresponding to the first service provider network may be associated with a BSSID that is different than a BSSID associated with an access point corresponding to the second service provider network.

To create a network identifier that distinguishes each service provider network of the set of service provider networks form other service provider networks, access point address information 236 may append an SSID corresponding to each service provider network of the set of service provider networks with a BSSID corresponding to an access point corresponding to the service provider network. Since two service provider networks associated with the same SSID may each correspond to an access point having a unique BSSID, appending SSIDs with BSSIDs may create network identifiers that distinguish the two service provider networks.

A BSSID may represent a MAC address that includes six pairs of characters separated by colons. For example, a BSSID may include the format "aa:bb:cc:dd:ee:ff" In the example of FIGS. 1A-1C, a first service provider network such as service provider network 105A may correspond to access point 104A and a second service provider network such as service provider network 105B may correspond to access point 104B. Service provider network 105A and service provider network 105B may be associated with the same SSID, "Passpoint-WiFi." Access point 104A may be associated with the BSSID "AA:AA:AA:AA:AA:01" and access point 104B may be associated with the BSSID "BB:BB:BB:BB:BB:01."

In some examples, access point address unit 224 may append the SSID "Passpoint-WiFi" with the BSSID "AA:AA:AA:AA:AA:01" to create a final SSID "Passpoint-WiFi-AA:AA:AA:AA:AA:01" for service provider network 105A. Access point address unit 224 may append the SSID "Passpoint-WiFi" with the BSSID "BB:BB:BB:BB:BB:01" to create a final SSID "Passpoint-WiFi-BB:BB:BB:BB:BB:01" for service provider network 105B Since access point 104A and access point 104B are associated with BSSIDs, appending the SSID with the different BSSIDs results in different final SSIDS for service provider network 105A and service provider network 105B.

Appending the SSID of each service provider network with a BSSID of an access point of the service provider network may be beneficial because the SSID for a service provider network and the BSSID for an access point may stay the same even as service provider information elements (e.g., domains name lists, OIs, and NAI realms) are changed. This means that hash values generated by hash unit 222 may change over time as the service provider information elements change. Access point address unit 224 may generate network identifiers for distinguishing service provider networks by appending SSIDs with BSSIDs to create network identifiers that remain constant over an extended period of time. This may decrease a risk that users will be confused by network identifiers that change over time.

Random character unit 226 of network identifier unit 220 may create, for each service provider network of a set of service provider networks, a network identifier that distinguishes the service provider network from other service provider networks of the set of service provider networks. For example, random character unit 226 may generate a random character string for each network device of the set of network devices. In some examples, the random character string for each network device of the set of network devices may be separate from the service provider information elements stored in memory 210 as part of service provider network information 232 and separate from the network name information 234. Random character unit 226 may append the SSID corresponding to each service provider network of the set of service provider networks with the random character string for the service provider network to create the network identifier for the service provider network.

In some examples, random character unit 226 may generate a first random character string "asdf32" for a first service provider network (e.g., service provider network 105A of FIGS. 1A-1C) and generate a second random character string "hjkl78" for a second service provider network (e.g., service provider network 105B of FIGS. 1A-1C). Service provider network 105A and service provider network 105B may be associated with the same SSID, "Passpoint-WiFi." Random character unit 226 may append the SSID with the random character string for each service provider network to create the network identifier "Passpoint-WiFi-asdf32" for service provider network 105A and the network identifier "Passpoint-WiFi-hjkl78" for service provider network 105B.

Appending the SSID of each service provider network with a random character string for the service provider network may be beneficial because the SSID for a service provider network and the random number generated for the service provider network may stay the same even as service provider information elements (e.g., domains name lists, OIs, and NAI realms) are changed. This means that hash values generated by hash unit 222 may change over time as the service provider information elements change. Random character unit 226 may generate network identifiers for distinguishing service provider networks by appending SSIDs with random numbers to create network identifiers that remain constant over an extended period of time. This may decrease a risk that users will be confused by network identifiers that change over time.

Network identifier unit 220 may use any one or combination of hash unit 222, access point address unit 224, and random character unit 226 to generate a network identifier for each service provider network of the set of service provider networks. That is, network identifier unit 220 may include any one or combination of hash unit 222, access point address unit 224, and random character unit 226. Each of hash unit 222, access point address unit 224, and random character unit 226 may be configured to distinguish service provider networks to prevent client devices 106 from mistakenly connecting to the wrong network and to allow client devices 106 to roam seamlessly between networks without issues at network edges.

An appended network name for each service provider network of a set of service provider networks may be saved in memory 210 as unique network identifier information 238. In some examples, network identifier system 200 may output the appended network name for each service provider network of a set of service provider networks to the corresponding access point of a set of access points. For example, network identifier system 200 may output an appended network name for service provider network 105A of FIGS. 1A-1C to access point 104A of FIGS. 1A-1C and output an appended network name for service provider network 105B of FIGS. 1A-1C to access point 104B of FIGS. 1A-1C.

FIG. 3 is a flow diagram illustrating an example operation for appending network names to distinguish service provider networks, in accordance with one or more techniques of this disclosure. The example operation is described with respect to wireless network systems 100A-100C of FIGS. 1A-1C, and components thereof. However, the techniques of FIG. 3 may be performed by different components of wireless network systems 100A-100C, or by additional or alternative systems.

Processing circuitry 108 may be configured to identify, for each service provider network of service provider networks 105, a network name associated with the service provider network (302). In some examples, two or more service provider networks of service provider networks 105 are associated with the same network name. Processing circuitry 108 may append the network name corresponding to each service provider network of the set of service provider networks with a respective network identifier to generate a set of appended network names (304). Each appended network name of the set of appended network names may be different than each other appended network name of the set of appended network names.

Since the appended network name for each service provider network is different than the appended network names for other networks, the appended network names may distinguish a service provider network from other service provider networks. This means that even though two or more service provider networks are associated with the same network name, appended network names distinguish the two or more service provider networks from each other. Processing circuitry 108 may output, to a network device corresponding to each service provider network of the set of service provider networks, the appended network name corresponding to the service provider network (306).

FIG. 4 is a flow diagram illustrating an example operation for using appended network names to prevent service interruptions, in accordance with one or more techniques of this disclosure. The example operation is described with respect to wireless network systems 100A-100C of FIGS. 1A-1C, and components thereof. However, the techniques of FIG. 4 may be performed by different components of wireless network systems 100A-100C, or by additional or alternative systems.

Access point 104A may receive a first appended network name associated with a service provider network 105A corresponding to access point 104A (402). Access point 104B may receive a second network name associated with a service provider network 105B corresponding to access point 104B (404). In some examples, the first appended network name may be different than the second appended network name. In some examples, service provider network 105A and service provider network 105B may be associated with the same network name. The first appended network name may be appended with a first network identifier that distinguishes the service provider network 105A from the service provider network 105B and the second appended network name may be appended with a second network identifier that distinguishes the service provider network 105B from the service provider network 105A.

Access point 104A and access point 104B may cause one or more client devices of client devices 106 subscribed to service provider network 105A and not subscribed to service provider network 105B to avoid connecting to service provider network 105B (406). For example, since service provider network 105A and service provider network 105B are associated with different appended network names (e.g., different final SSIDs), the one or more client devices of client devices 106 subscribed to service provider network 105A and not subscribed to service provider network 105B may avoid selecting service provider network 105B during the BSS selection phase even when service provider network 105A and service provider network 105B are associated with the same network name. This is because when service provider network 105A and service provider network 105B are associated with different final SSIDs, provider network 105A and service provider network 105B are distinguished so that client devices 106 are able to identify differences between service provider network 105A and service provider network 105B.

Access point 104A and access point 104B may cause one or more client devices of client devices 106 subscribed to service provider network 105B and not subscribed to service provider network 105A to avoid connecting to service provider network 105A (408). For example, since service provider network 105A and service provider network 105B are associated with different appended network names, the one or more client devices of client devices 106 subscribed to service provider network 105B and not subscribed to service provider network 105A may avoid selecting service provider network 105A during the BSS selection phase even when service provider network 105A and service provider network 105B are associated with the same network name. This is because service provider network 105A and service provider network 105B are associated with different appended network names. Access point 104A and access point 104B may cause one or more client devices of client devices 106 subscribed to the service provider network 105A and service provider network 105B to roam between service provider network 105A and service provider network 105B without service interruption (410).

The following describes example techniques in accordance with one or more examples described in this disclosure. The example techniques may be utilized together or separately.

Example 1. A network system comprising: a memory; and processing circuitry in communication with the memory, wherein the processing circuitry is configured to: identify, for each service provider network of a set of service provider networks, a network name associated with the service provider network, wherein two or more service provider networks of the set of service provider networks are associated with the same network name; append the network name corresponding to each service provider network of the set of service provider networks with a respective network identifier to generate a set of appended network names, wherein each appended network name of the set of appended network names is different than each other appended network name of the set of appended network names; and output, to a network device corresponding to each service provider network of the set of service provider networks, the appended network name corresponding to the service provider network.

Example 2. The network system of example 1, wherein the network name corresponding to each service provider network of the set of service provider networks comprises a service set identifier.

Example 3. The network name of any of examples, 1-2, wherein the processing circuitry is further configured to identify a set of network identifiers, each network identifier of the set of network identifiers corresponding to a service provider network of the set of service provider networks, and wherein to append the network name corresponding to each service provider network of the set of service provider networks with the network identifier to generate the set of appended network names, the processing circuitry is configured to append, for each service provider network of the set of service provider networks, the network name corresponding to the service provider network with the network identifier corresponding to the service provider network.

Example 4. The network name of example 3, wherein to identify the set of network identifiers, the processing circuitry is further configured to: receive a set of service provider information elements corresponding to each service provider network of the set of service provider networks; and apply, to the set of service provider information elements corresponding to each service provider network of the set of service provider information networks, a hash function to generate a hash value representing the network identifier for the service provider network corresponding to the set of service provider information elements.

Example 5. The network name of example 4, wherein the set of service provider information elements corresponding to each service provider network of the set of service provider networks comprises a domain name list, an organization identifier (OI), and a network access identifier (NAI) realm.

Example 6. The network name of any of examples, 4-5, wherein the processing circuitry is further configured to, for each service provider network of the set of service provider networks, combine the set of service provider information elements into a hash input string, and wherein to apply the hash function to the set of service provider information elements corresponding to each service provider network of the set of service provider information networks, the processing circuitry is configured to: apply the hash function to the hash input string to generate a hash output string; and apply a shortening function to the hash output string to generate the hash value.

Example 7. The network name of any of examples, 3-6, wherein the network device corresponding to each service provider network of the set of service provider networks is associated with a network device address that distinguishes the network device from other network devices corresponding to the set of service provider networks, and wherein to identify the set of network identifiers, the processing circuitry is configured to identify the network device address associated the network device corresponding to each service provider network of the set of service provider networks.

Example 8. The network name of example 7, wherein the network device address associated with the network device corresponding to each service provider network of the set of service provider networks comprises a basic service set identifier (BSSID).

Example 9. The network name of any of examples 7-8, wherein the network device address associated with the network device corresponding to each service provider network of the set of service provider networks comprises a media access control (MAC) address.

Example 10. The network name of any of examples 1-9, wherein the processing circuitry is further configured to generate, for each service provider network of the set of service provider networks, a random character string, and wherein to append the network name corresponding to each service provider network of the set of service provider networks with the network identifier, the processing circuitry is configured to append the network name with the random character string corresponding to the service provider network.

Example 11. The network name of any of examples 1-10, further comprising a network device of the set of network devices, wherein the network device is configured to: receive, from a client device, network connection query; and output, to the client device based on receiving the network connection query, information indicating the appended network name corresponding to the network device.

Example 12. The network name of any of examples 1-11, wherein the network connection query comprises an access network query protocol (ANQP) query.

Example 13. The network name of example 11, wherein the network device is a first network device, wherein the appended network name is a first appended network name, wherein the network connection query is a first network connection query, wherein the network system further comprises a second network device of the set of network devices, and wherein the second network device is configured to: receive, from the client device, a second network connection query; output, to the client device based on receiving the second network connection query, information including a second appended network name corresponding to the second network device; and receive, based on the first network device outputting the first appended network name and the second network device outputting the second appended network name, a request from the client device to connect to the second network device.

Example 14. The network name of any of examples 1-13, wherein each network device of the set of network devices comprises an access point (AP).

Example 15. A method comprising: identifying, by processing circuitry in communication with a memory for each service provider network of a set of service provider networks, a network name associated with the service provider network, wherein two or more service provider networks of the set of service provider networks are associated with the same network name; appending, by the processing circuitry, the network name corresponding to each service provider network of the set of service provider networks with a respective network identifier to generate a set of appended network names, wherein each appended network name of the set of appended network names is different than each other appended network name of the set of appended network names; and outputting, by the processing circuitry, to a network device corresponding to each service provider network of the set of service provider networks, the appended network name corresponding to the service provider network.

Example 16. The method of example 15, wherein the method further comprises identifying a set of network identifiers, each network identifier of the set of network identifiers corresponding to a service provider network of the set of service provider networks, and wherein appending the network name corresponding to each service provider network of the set of service provider networks with the network identifier to generate the set of appended network names comprises appending, for each service provider network of the set of service provider networks, the network name corresponding to the service provider network with the network identifier corresponding to the service provider network.

Example 17. The method of example 16, wherein identifying the set of network identifiers comprises: receiving, by the processing circuitry, a set of service provider information elements corresponding to each service provider network of the set of service provider networks; and applying, by the processing circuitry to the set of service provider information elements corresponding to each service provider network of the set of service provider information networks, a hash function to generate a hash value representing the network identifier for the service provider network corresponding to the set of service provider information elements.

Example 18. The method of any of examples 16-17, wherein the network device corresponding to each service provider network of the set of service provider networks is associated with a network device address that distinguishes the network device from other network devices corresponding to the set of service provider networks, and wherein identifying the set of network identifiers comprises identifying, by the processing circuitry, the network device address associated the network device corresponding to each service provider network of the set of service provider networks.

Example 19. The method of any of examples 15-18, wherein the method further comprises generating, by the processing circuitry for each service provider network of the set of service provider networks, a random character string, and wherein appending the network name corresponding to each service provider network of the set of service provider networks with the network identifier comprises appending the network name with the random character string corresponding to the service provider network.

Example 20. A computer-readable medium comprising instructions that, when executed by processing circuitry, causes the processing circuitry to: identify, for each service provider network of a set of service provider networks, a network name associated with the service provider network, wherein two or more service provider networks of the set of service provider networks are associated with the same network name; append the network name corresponding to each service provider network of the set of service provider networks with a respective network identifier to generate a set of appended network names, wherein each appended network name of the set of appended network names is different than each other appended network name of the set of appended network names; and output, to a network device corresponding to each service provider network of the set of service provider networks, the appended network name corresponding to the service provider network.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" or "controller" as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A network system comprising:
a set of network devices including a first network device and a second network device;
a memory; and
processing circuitry in communication with the memory, wherein the processing circuitry is configured to:
identify, for each service provider network of a set of service provider networks, a network name associated with the service provider network, wherein two or more service provider networks of the set of service provider networks are associated with the same network name;
append the network name corresponding to each service provider network of the set of service provider networks with a respective network identifier to generate a set of appended network names, wherein each appended network name of the set of appended network names is different than each other appended network name of the set of appended network names; and
output, to respective network devices of the set of network device corresponding to each service provider network of the set of service provider networks, a respective appended network name of the set of appended network names corresponding to the service provider network, wherein the first network device is configured to:
receive, from a client device, a first network connection query; and
output, to the client device based on receiving the first network connection query, information indicating a first appended network name corresponding to the first network device, and
wherein the second network device is configured to:
receive, from the client device, a second network connection query;
output, to the client device based on receiving the second network connection query, information indicating a second appended network name corresponding to the second network device; and
receive, based on the first network device outputting the first appended network name and the second network device outputting the second appended network name, a request from the client device to connect to the second network device.

2. The network system of claim 1, wherein the network name corresponding to each service provider network of the set of service provider networks comprises a service set identifier.

3. The network system of claim 1,
wherein the processing circuitry is further configured to identify a set of network identifiers, each network identifier of the set of network identifiers corresponding to a service provider network of the set of service provider networks, and wherein to append the network name corresponding to each service provider network of the set of service provider networks with the network identifier to generate the set of appended network names, the processing circuitry is configured to append, for each service provider network of the set of service provider networks, the network name corresponding to the service provider network with the network identifier corresponding to the service provider network.

4. The network system of claim 3, wherein to identify the set of network identifiers, the processing circuitry is further configured to:

receive a set of service provider information elements corresponding to each service provider network of the set of service provider networks; and apply, to the set of service provider information elements corresponding to each service provider network of the set of service provider information networks, a hash function to generate a hash value representing the network identifier for the service provider network corresponding to the set of service provider information elements.

5. The network system of claim 4, wherein the set of service provider information elements corresponding to each service provider network of the set of service provider networks comprises a domain name list, an organization identifier (OI), and a network access identifier (NAI) realm.

6. The network system of claim 4, wherein the processing circuitry is further configured to, for each service provider network of the set of service provider networks, combine the set of service provider information elements into a hash input string, and wherein to apply the hash function to the set of service provider information elements corresponding to each service provider network of the set of service provider information networks, the processing circuitry is configured to:

apply the hash function to the hash input string to generate a hash output string; and apply a shortening function to the hash output string to generate the hash value.

7. The network system of claim 3, wherein the respective network device corresponding to each service provider network of the set of service provider networks is associated with a network device address that distinguishes the respective network device from other network devices corresponding to the set of service provider networks, and wherein to identify the set of network identifiers, the processing circuitry is configured to identify the network device address associated with the respective network device corresponding to each service provider network of the set of service provider networks.

8. The network system of claim 7, wherein the network device address associated with the respective network device corresponding to each service provider network of the set of service provider networks comprises a basic service set identifier (BSSID).

9. The network system of claim 7, wherein the network device address associated with the respective network device corresponding to each service provider network of the set of service provider networks comprises a media access control (MAC) address.

10. The network system of claim 1, wherein the processing circuitry is further configured to generate, for each service provider network of the set of service provider networks, a random character string, and wherein to append the network name corresponding to each service provider network of the set of service provider networks with the network identifier, the processing circuitry is configured to append the network name with the random character string corresponding to the service provider network.

11. The network system of claim 1, wherein the first network connection query or the second network connection query comprises an access network query protocol (ANQP) query.

12. The network system of claim 1, wherein each network device of the set of network devices comprises an access point (AP).

13. A method comprising:

identifying, by processing circuitry in communication with a memory for each service provider network of a set of service provider networks, a network name associated with the service provider network, wherein two or more service provider networks of the set of service provider networks are associated with the same network name;

appending, by the processing circuitry, the network name corresponding to each service provider network of the set of service provider networks with a respective network identifier to generate a set of appended network names, wherein each appended network name of the set of appended network names is different than each other appended network name of the set of appended network names;

outputting, by the processing circuitry, to respective network devices of a set of network devices corresponding to each service provider network of the set of service provider networks, a respective appended network name of the set of appended network names corresponding to the service provider network, receiving, with a first network device of the set of network devices and from a client device, a first network connection query;

outputting, with the first network device and to the client device based on receiving the first network connection query, information indicating a first appended network name corresponding to the first network device;

receiving, with a second network device of the set of network devices and from the client device, a second network connection query;

outputting, with the second network device and to the client device based on receiving the second network connection query, information indicating a second appended network name corresponding to the second network device; and receiving, based on the first network device outputting the first appended network name and the second network device outputting the second appended network name, a request from the client device to connect to the second network device.

14. The method of claim 13, wherein the method further comprises identifying a set of network identifiers, each network identifier of the set of network identifiers corresponding to a service provider network of the set of service provider networks, and wherein appending the network name corresponding to each service provider network of the set of service provider networks with the network identifier to generate the set of appended network names comprises appending, for each service provider network of the set of service provider networks, the network name corresponding to the service provider network with the network identifier corresponding to the service provider network.

15. The method of claim 14, wherein identifying the set of network identifiers comprises:

receiving, by the processing circuitry, a set of service provider information elements corresponding to each service provider network of the set of service provider networks; and applying, by the processing circuitry to the set of service provider information elements corresponding to each service provider network of the set of service provider information networks, a hash function to generate a hash value representing the network identifier for the service provider network corresponding to the set of service provider information elements.

16. The method of claim 14, wherein the respective network device corresponding to each service provider network of the set of service provider networks is associated with a network device address that distinguishes the respective network device from other network devices corresponding to the set of service provider networks, and wherein identifying the set of network identifiers comprises identifying, by the processing circuitry, the network device address associated with the respective network device corresponding to each service provider network of the set of service provider networks.

17. The method of claim 13, wherein the method further comprises generating, by the processing circuitry for each service provider network of the set of service provider networks, a random character string, and wherein appending the network name corresponding to each service provider network of the set of service provider networks with the network identifier comprises appending the network name with the random character string corresponding to the service provider network.

32

18. A network system comprising:

a memory; and processing circuitry in communication with the memory, wherein the processing circuitry is configured to:

identify, for each service provider network of a set of service provider networks, a network name associated with the service provider network, wherein two or more service provider networks of the set of service provider networks are associated with the same network name;

identify a set of network identifiers, each network identifier of the set of network identifiers corresponding to a service provider network of the set of service provider networks, wherein to identify the set of network identifiers, the processing circuitry is further configured to:

receive a set of service provider information elements corresponding to each service provider network of the set of service provider networks; and apply, to the set of service provider information elements corresponding to each service provider network of the set of service provider information networks, a hash function to generate a hash value representing the network identifier for the service provider network corresponding to the set of service provider information elements; and append, for each service provider network of the set of service provider networks, the network name corresponding to the service provider network with the network identifier corresponding to the service provider network to generate a set of appended network names, wherein each appended network name of the set of appended network names is different than each other appended network name of the set of appended network names; and output, to respective network devices corresponding to each service provider network of the set of service provider networks, the appended network name corresponding to the service provider network.

* * * * *